Sept. 16, 1969  R. A. GAUTIER  3,467,349
SYSTEM AND METHOD FOR FREEING AIRCRAFT FUELS OF
MOISTURE, MICRO-ORGANISMS AND
OTHER CONTAMINANTS
Filed Nov. 9, 1967

INVENTOR.
ROBERT A. GAUTIER
BY
Cushman, Darby & Cushman
ATTORNEYS

United States Patent Office 3,467,349
Patented Sept. 16, 1969

3,467,349
SYSTEM AND METHOD FOR FREEING AIRCRAFT FUELS OF MOISTURE, MICRO-ORGANISMS AND OTHER CONTAMINANTS
Robert A. Gautier, 2 Winfield, Houma, La. 70360
Filed Nov. 9, 1967, Ser. No. 681,653
Int. Cl. B64d 37/32, 37/34
U.S. Cl. 244—135          10 Claims

ABSTRACT OF THE DISCLOSURE

An improved system is described for purging aircraft fuel tanks with an inert gas so as to prevent condensation or other admission of moisture into the tanks, thereby preventing the growth of micro-organisms. The improved system can be operated so as to eliminate any requirement for pressurizing fuel tanks, but can be operated in connection with a pressurized system, if desired. In the system, an inert gas, such as nitrogen gas, is automatically introduced into a fuel tank in accordance with a very slight pressure differential between the interior and exterior of the tank in unpressurized systems, and between the tank and a pressure on the regulator in pressurized systems. The system utilizes a demand regulator to control automatic intromission of nitrogen gas from a storage container to the fuel tank which is being treated. The system also provides for a regulation of the amount of inert gas within the fuel tank in accordance with changing pressures, temperatures, and quantities of fuel within the tank. The controls provided by the system permit a purging of fuel storage and supply equipment for aircraft, such as supersonic transport craft, which normally operated within a broad range of temperatures and ambient pressures.

BACKGROUND OF INVENTION

The problem of removing water from aircraft fuel, and in particular jet fuel, has been long considered a serious one. It is known that a certain amount of moisture or water exists in all jet fuel, and many attempts have been made to treat jet fuel so as to reduce the water content to an acceptable level (presently, no more than 30 parts per million). However, attempts to treat jet fuel to eliminate water are largely limited to a treatment of the fuel while it is in ground storage or just before it is dispensed into fuel tanks of an aircraft vehicle. Once the fuel is in a fuel tank, water will find its way into the tank by condensation and through the conventional vent of the tank when atmospheric air is drawn into the tank.

The existence of water in jet fuel is of very serious concern, since water results in icing conditions at high altitudes, and also, water provides an environment in which micro-organisms can develop and propagate. It is now well-known that micro-organisms in jet fuel are accountable for serious damage from corrosion and contamination. Micro-organisms thrive and grow in the presence of water, and they produce slimes which clog fuel filters and which give inaccurate gauge readings. Further, the metabolic activities of micro-organisms, in combination with entrapment of water within the fuel, result in corrosive damage to fuel tank linings and to any exposed metal in a fuel storage or supply system of an aircraft. Also, the existence of water in fuel, in itself, accounts for considerable damage to fuel storage and supply systems from the corrosive action of the water, even without the existence of micro-organisms in the fuel.

Know methods of treating jet fuel have considered the addition of chemical treating agents to remove water, and also, mechanical filters have been used to coalesce water for ultimate removal from fuel. However, the addition of chemical treating agents often counteracts the capability of a coalescent type filter to remove water from a fuel because chemical treating agents usually reduce interface tension between fuel and water to the extent that water droplets are less likely to coalesce into larger drops which can be removed by a filter. Thus, it has been an accepted fact that jet fuel is never entirely free of water even when first introduced into a fuel tank, and it is well known that water from condensation and from ambient air is added to a fuel tank once an aircraft is in flight. Pressure and temperature changes within a tank account for a certain amount of condensation, and normal consumption of fuel from a tank draws in ambient air containing moisture which contributes to additional condensation.

It is also known in the prior art to introduce an inert gas, such as carbon dioxide or nitrogen, into a fuel tank for the purpose of displacing some or all of the air in the tank. Known systems have been most often concerned with preventing fire and explosions from fuel vapors within a fuel tank, and therefore, efforts have been directed largely to a mere dilution of fuel vapors with an inert gas so as to reduce possibility of vapor explosions. Also, a pressurization of closed fuel systems has been tried, but pressurization systems have required relatively complex control devices for regulating the flow of a high pressure inert gas to a fuel tank. Lack of reliability and uncertain safety of such complex systems have been a major factor in a nonacceptance of known systems by the aircraft industry and by Federal regulatory agencies.

Examples of known prior art systems are represented in a number of U.S. patents. Davis Patent 2,341,268 discloses a very complex system for pressurizing a fuel tank with carbon dioxide for preventing fire and explosions. Although an upper limit of pressure is established in the fuel tank by a valving system, much of the reliability and safety of the system depends upon continued operation of cooperating valve elements. Thus, the special requirements of a pressurization system involve complex structures which are often subject to failure and unreliable operation. A similar pressurization system is shown in Taylor Patent 2,983,405 wherein a mixture of nitrogen and air is added to a fuel tank. It is also known to attempt to purge a fuel tank with a closed system of the type shown in Quachen Patent 2,890,936, wherein relatively complex circuits and pumping devices are required to maintain vapor space in fuel tanks in a nonflammable and nonexplosive condition. Other attempts have been directed to diluting fuel vapors in fuel tanks for the purpose of reducing the possibility of explosion, and systems for merely diluting fuel vapor are disclosed in Heigis Patent 2,406,373, Adamson Patent 2,718,330. Other systems have permitted an entrance of moisture-laden atmospheric air into the fuel system under certain conditions, as shown in Swigart et al. Patent 2,740,604. An attempt has even been made to produce an inert gas aboard an aircraft with a gas generation system of the type shown in Bridgeman Patent 2,952,428.

However, none of the systems discussed above has been accepted for use by the aircraft industry and by Federal regulatory agencies as reliable systems for solving the problems of water and micro-organism growth in jet fuel. In contrast, the present invention is directed to a solution of the particular problems encountered with aircraft fuel, and the problems are of an even greater concern where jet fuel is to be utilized in vehicles of the type proposed by the supersonic transport development. The principles of this invention apply to ground handling and storage of aircraft fuel as well as to the treatment of fuel while it is being carried in and consumed by an aircraft.

BRIEF DESCRIPTION OF INVENTION

The present invention is related to a system and method for treating aircraft fuel, such as jet fuel, and the invention provides for automatic intromission of an inert gas into fuel storage and supply equipment so that condensation or entry of water into the fuel is prevented.

Recognizing the existence of water as being a primary problem in jet fuel, it can be seen that the problem becomes magnified when jet fuel must be used in supersonic transport types of aircraft which undergo greater ranges of temperature and pressure changes in their normal course of operation. Thus, icing and micro-organism problems, which have existed to a serious degree in fuel used in subsonic aircraft, become even greater concerns when the fuel is to be used in aircraft flying at higher altitudes and at speeds which produce greater temperature differentials in various parts of the aircraft structure and during various times of a flight. Although fuel can be treated to a certain extent prior to actually dispensing it into aircraft fuel tanks, it is apparent that a system is needed for maintaining fuel free of water while it is being carried and consumed in a flying situation.

In a typical fuel supply system for aircraft vehicles, a means is provided for pumping fuel from a fuel tank to its ultimate point of combustion in a jet engine, or in whatever power plant is being used. Because an aircraft vehicle is expected to undergo continual changes in altitude, there is usually provided a venting system in conventional fuel tanks for adjusting inside pressure conditions of the tanks relative to conditions outside of the tanks. Pressure changes within a tank may be a result of consuming or transferring fuel while in flight, or a result of an increase or decrease in outside pressure conditions as altitude is changed. In a typical flight, an aircraft leaves the ground and ascends to a desired altitude. During ascent, fuel is being consumed, and ambient air is drawn into the tank through its venting system to fill the space previously occupied by fuel. Also, during ascent, there is a change in ambient pressure and temperature conditions, and certain combinations of these changes may result in water condensation within the vapor space of a fuel tank. Water condenses out of ambient air which has been drawn into the tank and a substantial decrease in temperature accelerates the condensation rate. Of course, it can be appreciated that the very high altitudes contemplated by supersonic transport vehicles will magnify condensation problems even more than has been experienced in the past.

The present invention solves the problems of water condenstaion and microorganism growth in jet fuel by isolating fuel storage and supply equipment in an aircraft from any admission of atmospheric air into the equipment. However, it is not sufficient to merely provide for a closed system with no venting at all to the atmosphere because it is necessary to provide for an exhausting of gases from a fuel tank, or other equipment, when pressure conditions within the tank rise above a certain differential, as compared to outside pressure conditions. Closed systems have been attempted, but such systems have required very complex valving and circuiting devices to control a fuel supply system. The present invention avoids a requirement for a completely closed system by providing a one-way exhaust vent in fuel storage and supply equipment, and by providing for an automatic intromission of inert gas into the equipment under certain conditions.

The system of the present invention provides for an automatic intromission of inert gas, such as nitrogen gas, into the vapor space of a fuel tank, or other fuel storage and supply equipment carried by an aircraft. The inert gas is added into the fuel tank without pressurizing the tank. It is important to be able to automatically purge a tank without pressurizing the same, in order to avoid risks of overpressurization and to eliminate complex control apparatus which would be possibly unreliable at the operating conditions contemplated by supersonic transport vechiles. The automatic intromission of inert gas into a fuel tank is accomplished by a novel combination of a demand flow regulator with an inert gas supply system which is connected to the fuel supply system of the aircraft. The inert gas is stored in a liquid state and is withdrawn from a storage container in accordance with relatively small pressure differentials which exist inside and outside of the jet fuel tank. A demand flow regulator prevents the flow of an inert gas into the jet fuel tank until the interior pressure of the tank has undergone a pressure drop of approximately $\frac{1}{40}$ p.s.i.g. (or vacuum of $\frac{7}{10}$ inch of water) as compared to outside pressure conditions around the tank. The pressure drop differential, of the inside of the tank as compared to ambient conditions, may be a result of fuel consumption within the tank, fuel transfer, or of a decrease in altitude of the aircraft. The system also includes means for exhausting inert gas from a fuel tank when pressure conditions within the tank increase slightly relative to ambient pressure. Such a change in pressure conditions occurs when the tank is being refilled, when fuel is transferred, or when an aircraft is ascending in altitude. Likewise, extreme temperature changes, whether from changes in atmospheric conditions or from heating and cooling of structural components of the aircraft, will affect pressure conditions in, and around, a fuel system.

The method of the present invention comprises the step of filling all vapor space above liquid or gel fuel in a tank with an inert gas, and maintaining an intromission of inert gas into the tank in accordance with demand, as based upon temperature and pressure changes, consumption of fuel, fuel transfer, and refueling of the tank. Further, the method includes a step of isolating the fuel tank from outside atmosphere while at the same time providing for an exhaustion of excess inert gas to the atmosphere, in accordance with predetermined pressure differentials between the inside of the tank and ambient conditions.

The invention overcomes certain unsafe and unreliable arrangements which have been proposed in the past, and the system which is disclosed is easily manufactured and maintained. Further, the invention eliminates a requirement for using greater and greater quantities and numbers of chemical fuel additives in fuel which is to be used in a jet aircraft fuel system, and fuel can be treated in accordance with the invention while it is being stored, handled, or transported on the ground as well as in the air. By reducing the cost of chemical treatment of fuels, and by providing a safe and reliable system and method for treating fuel right up to the time that it is burned in a jet engine, a very worthwhile contribution is made to the aircraft industry and to the safety of persons using air transportation.

These and other features and advantages of the present invention will be discussed with greater detail below, and in the detailed discussion reference will be made to the following drawings:

DETAILED DESCRIPTION OF INVENTION

Figure 1:
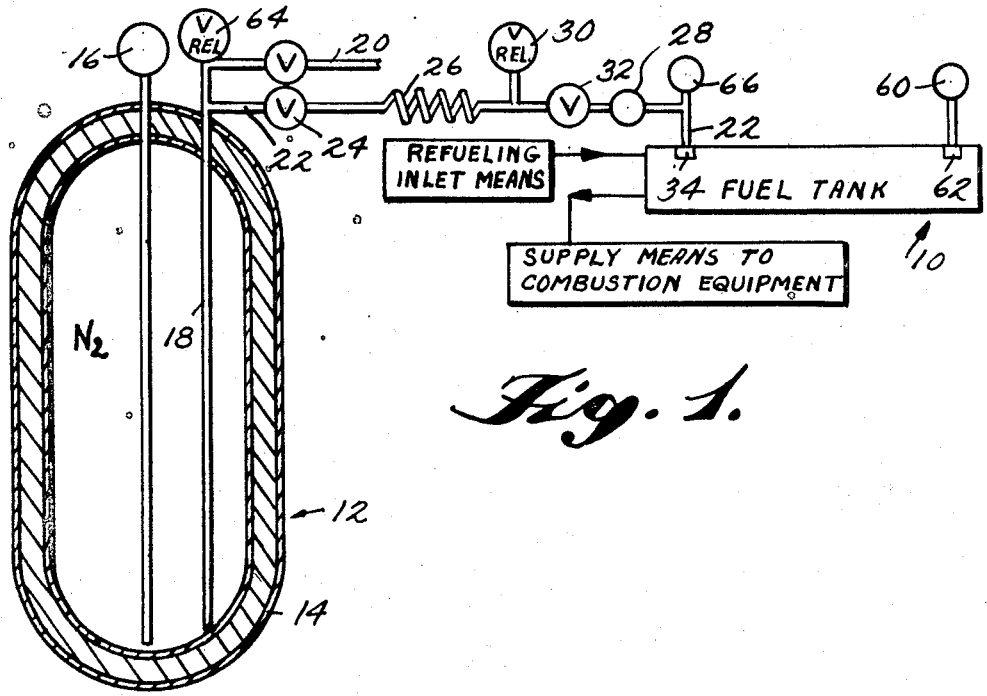
FIGURE 1 schematically illustrates a system for maintaining fuel storage and supply equipment in a water-free condition, in accordance with the present invention.

Referring to FIGURE 1, there is shown a complete system for automatically controlling an intromission of inert gas into fuel storage and supply equipment of the type carried by jet aircraft. Although this specification will make reference to fuel tanks, it is to be understood that any fuel storage system, as found within an aircraft construction, is contemplated by the term "tank." For example, present-day systems provide for a storage of fuel in wing and fuselage portions of an aircraft, provided certain safety standards are met. Thus, the system shown in FIGURE 1 applies to any storage and dispensing of fuel on board an aircraft vehicle.

A fuel tank 10, as used in the system of this invention, is of any conventional construction and may include well-known structures for lining and sealing the tank. Means are provided for adding fuel to the tank when refueling is necessary, and conventional structures are provided for pumping fuel out of the tank and to the combustion equipment of the aircraft power plant. Since the fuel inlet and outlet equipment of the tank are conventional in form, and are not a separate part of the present invention, they have been omitted from the drawings for clarity. Aside from standard arrangements for admitting fuel into and dispensing fuel from the tank, the present invention provides for a system for automatically intromitting an inert gas into the tank 10 on a demand basis. The inert gas system includes a storage container 12 which may be of a double wall construction to provide an insulating layer 14 about the entire container. Inert gas, in liquid form, is stored within the container, and the gas in released from the container in a vapor form in accordance with demand requirements dictated by comparative pressure conditions within the fuel tank 10. The storage container 12 may include a conventional, remotely controlled, liquid level gauge 16 for indicating the level of liquid within the storage container 12, and the gauge 16 may be mounted on an instrument panel of the aircraft. Additionally, a conduit 18 communicates with the interior of the storage container, and the conduit 18 functions as an inlet and an outlet for adding inert gas into, and for carrying gas from, the storage container interior. A conventional inlet valve and connector 20 communicates with the conduit 18 for refilling the storage container when necessary. An outlet conduit 22 also communicates with the conduit 18, and the outlet conduit 22 ultimately enters the fuel tank 10. Flow of fluid out of the storage container 12 and through the outlet conduit 22 is regulated and controlled by a check valve 24, a vaporizer 26, and a variable flow, demand regulator 28. In addition, a relief valve 30 may be provided in the outlet conduit flow path, and a gas withdrawal valve 32 may be provded. At the point of communication of the conduit 22 with the tank 10, an additional check valve 34 is provided for preventing a back flow of fuel or fuel vapors into the nitrogen supply system. Thus, there is provided a relatively simple system for dispensing an inert gas into a fuel tank, without a requirement for pumping devices or means for pressurizing the fuel tank. However, the system does not consist of a mere flow path from a gas storage container to a fuel tank, and an important part of the successful operation of the system resides in the incorporation of a particular variable flow demand regulator 28 in the complete system. A type of demand regulator contemplated is shown in greater detail in FIGURE 2.

It is important to the present invention that inert gas be automatically introduced into a fuel tank in accordance with relatively slight changes in pressure differential, as measured between the inside pressure of the fuel tank and an external pressure factor. Where the system is of an unpressurized type, the tank pressure is related to pressure conditions of ambient atmosphere; and where the system is a pressurized type, the tank pressure is related to a predetermined pressure factor measured by the demand flow regulator. Also, it is important that an overpressurization of the tank be avoided.

Figure 2:
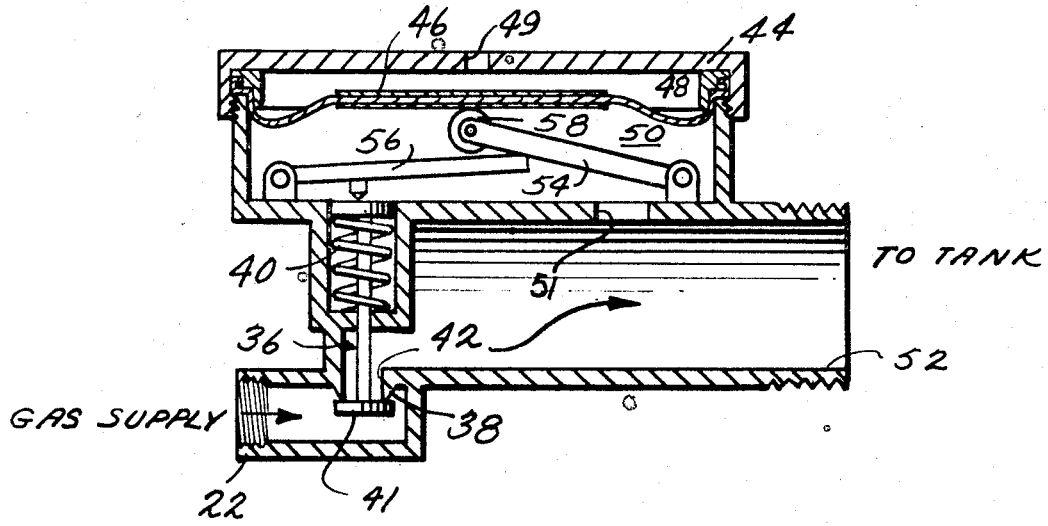
FIGURE 2 is a detailed cross-sectional view of a demand regulator used in an unpressurized system of the type shown in FIGURE 1.

Automatic control of inert gas flow into an unpressurized fuel tank 10 is provided by a demand regulator 28 of the type shown in FIGURE 2. The demand regulator 28 is of a variable flow type which maintains the outlet conduit 22 closed until a slight vacuum condition is established on the downstream side of the regulator. The measurement of a vacuum condition sufficient to open the conduit 22 is a factor of comparing inside and outside pressure conditions of the fuel tank 10, and this measurement is used to open the conduit 22 at a predetermined pressure differential. The variable flow demand regulator 28 includes a valve means 36 having a valve seat 38. The valve means 36 is normally biased upwardly by a coil spring 40 so as to maintain an end plate 41 of the valve means 36 in a sealed and closed position against valve seat 38 and over an opening 42 which communicates with an upstream portion of the conduit 22. The regulator includes a housing 44 having a diaphragm plate 46 included therein for measuring pressure differential and for actuating the valve means 36. The diaphragm means 46 divides the housing 44 into two compartments which are sealed from one another, a first compartment 48 in communication with atmospheric pressure conditions through an opening 49, and a second compartment 50 in communication (through opening 51) with pressure conditions within the downstream portion 52 of the conduit 22. Of course, the downstream portion of the conduit is in communication with pressure conditions in the fuel tank 10 so that any reduction in fuel tank pressure will be measured in the chamber 50 of the demand regulator 28. The demand regulator which is illustrated also includes a lever assembly made up of separate lever arms 54 and 56 which are each mounted on pivotal axes within the housing 44. The lever arm 54 includes a bearing member, such as a roller 58, which contacts a portion of the diaphragm 46 so that downward movement of the diaphragm will be relayed as a downward movement of the lever arm 56. The lever arm 56 includes a projecting member for contacting the upper end of the valve 36 so as to move the valve downwardly off from its valve seat 38 when the lever arm 56 is moved by the arm 54. Thus, when there is a reduction in pressure within the fuel tank 10, as compared to outside pressure conditions measured through the opening 49 of the regulator, there is a downward movement of the diaphragm 46; and the downward movement of the diaphragm opens the conduit 22 to permit a flow of inert gas into the fuel tank 10. Thus, there is provided a system for comparing changes in pressure conditions outside and inside of a fuel tank and for controlling the intromission of inert gas into a fuel tank in accordance with a predetermined measured pressure differential. It can be appreciated that the regulator 28 will function to open the valve 36 when pressure within the fuel tank is reduced slightly, but also, a similar opening of the valve 36 is obtained when ambient air pressure, as measured in the first compartment 48 of the regulator, is increased. This means that normal withdrawal of fuel from the fuel tank 10, for combustion uses or fuel transfer, will operate the valve 36 to supply inert gas into the fuel tank 10 to replace fuel consumed. Also, a descent of the aircraft, and an increase in ambient air pressure around the regulator 28, will open the valve 36 so that pressure conditions within the fuel tank are equalized with changing pressure conditions outside of the fuel tank. Equalization of tank pressure is especially important where extremes in altitude are encountered in the aircraft flight, and this invention provides for a compensating inert gas pressure which does not introduce atmospheric air and moisture into a fuel tank 10.

Since the inert gas supply system, and fuel tank, are provided with the check valve 34 for preventing a backflow of fuel or fuel vapors into the inert gas system, it can be seen that an incerase in tank pressure (or a decrease in ambient air pressure) cannot be compensated for by the demand regularor 28. Accordingly, a one-way exhaust vent 60 is provided in the fuel tank 10 for permitting flow of vapor in only one direction, out of the fuel tank. Thus, no atmospheric air or moisture can be drawn back into the tank when pressure conditions within the tank are reduced, and as already discussed, the demand regulator 28 provides for an equalizing volume of inert gas whenever such a reduction in relative tank pressure takes place. Exhaust vent 60 is fitted with a ball-in-cage type check valve 62 to prevent out flow of fuel at any time.

Considering a specific example of the unpressurized system just descirbed, it is contemplated that liquid nitrogen having a purity of 99.997% and a moisture content of one part per million, or less, will be used as the inert gas to be supplied from a storage container 12. The storage container 12 may be of any well-known construction which insulates said storage container suffciently to protect the contents and to maintain the liquid nitrogen at its working pressure and at a storage container temperature which maintains the nitrogen in a liquid state. By carrying nitrogen in liquide form, it is possible to substantially reduce the weight of the purging system when used in aircraft structures. For example, fifty pound containers of liquid nitrogen may be utilized, and the liquid nitrogen is stored at a storage container temperature which maintains the nitrogen in a liquid state. The storage container delivery pressure may be within the range of 50 to 75 p.s.i.g. (although even broader ranges are possible), and a safety relief valve 64 may be set to open above the contemplated safe pressure for the storage container. The second relief valve 30 is set at a safe margin above the contemplated gas delivery pressure, and typically a setting of 100 p.s.i.g. is used with the relief valve 30. The nitrogen may be dispensed from the storage container as either a liquid or a gas. The diagram of FIGURE 1 shows the dispensing of nitrogen in liquid form, with vaporization taking place in the vaporizer 26. Alternatively, the vaporizer can be included within the double wall structure of the storage container, and the nitrogen can be dispensed as a gas. The regulator 28 is constructed to operate at very slight pressure differentials, as measured by its diaphragm 46. In the unpressurized system of the example, the regulator will actuate with a pressure differential of $1/40$ p.s.i.g. (or vacuum of $7/10$ inch of water). A demand regulator 28, of the type illustrated in FIGURE 2, is sold by Mine Safety Appliances Company for operation within the differentials required by this invention, and an available regulator is sold at "Model 81070 Demand Regulator." The exhaust vent 60, which is provided in the fuel tank 10, may be set to operate at a pressure of 1 inch of water so as to exhaust inert gas from the tank when the tank is being filled, fuel is transferred, or when ambient pressure conditions are reduced. The check valve 34 is set to admit inert gas into the tank at the contemplated pressure differentials required to operate the valve means 36 of regulator 28. An emergency air intake valve 66 may be provided to balance the pressure within the tank in extreme situations or when inert gas has been totally consumed from the purging system. In the non-pressurized system, fuel tank pressure is normally 0 p.s.i.g., however, the fuel tank pressure may range from a vacuum of $7/10$ inch water to a pressure of 1 inch of water.

When the system is of a pressurized type, the regulator 28 of FIGURE 2 is modified to provide a spring bias on the diaphragm 46. This will maintain the fuel tank pressure at whatever pressure is desired (for example, 1 p.s.i.g.), and the valve 36 will be closed when pressure at outlet 42 is 1 p.s.i.g. In the modified embodiment, the chamber 48 of the regulator 28 is also open to the atmosphere. The diaphragm 46 may be spring loaded to provide the desired bias, and it is possible to provide for an adjustment of the spring load on the diaphragm in accordance with well-known practices. In a pressurized system, fuel tank pressure may range from $39/40$ p.s.i.g. to $1\frac{1}{28}$ p.s.i.g., as an example.

Having described the structural features of the system of the present invention, it can be seen that a method is provided for maintaining jet fuel tanks in aircraft vehicles in a water-free condition. The method comprises the steps of introducing an inert gas into a fuel tank on a demand basis, which is regulated by a very slight pressure reduction in the fuel tank. While inert gas is automatically intromitted into a fuel tank in accordance with the method, it is also important that the fuel tank be maintained isolated from any intake of ambient air. Thus, the method includes the steps of automatically intromitting inert gas when inside fuel tank pressure goes down a predetermined amount relative to ambient pressure outside of the tank, and expelling inert gas when outside ambient pressure goes down relative to inside tank pressure.

In use, the system operates to replace all consumed fuel with an inert gas and without the intake of any moist atmospheric air into the tank. The replacement of jet fuel with inert gas may take place whenever fuel is being consumed or transferred from the tank, or when the aircraft is moving from a higher altitude to a lower altitude. Likewise, a refilling of the tank (whether on the ground or in flight), or an ascent of the aircraft, may result in a change in pressure which exhausts excess inert gas from the tank through a one-way vent. At no time is moist air admitted into the tank, and the problem of moist condensation, icing, and micro-organism growth is eliminated in the fuel tank and delivery system of the aircraft. It can be appreciated that extreme temperature differences in the atmosphere may have similar effects upon the pressure differential being measured by the demand regulator 28. Such changes in temperature will likewise be compensated for by the automatic gas delivery system described in this invention.

Having described the invention, it can be seen that a safe and reliable system is provided for eliminating water problems from jet fuel storage and supply equipment. The system controls the automatic intromission of inert gas, so that no gas is wasted, and the system is easily maintained at a low cost of operation. Although the invention has been described with particular reference to fuel systems aboard aircraft, it will be appreciated that the principles of this invention can be applied to fuel treatment in other environments, such as treatment of fuel in ground storage and transportation equipment. The described system for intromitting inert gas into a tank or container can be applied to large ground storage tanks or to fuel tanks carried by ground vehicles. Likewise, the invention provides protection for aircraft fuel systems even when aircraft are grounded overnight or for a period of time on an air field. By isolating a fuel system from any contact with moisture-containing ambient air, there is a complete elimination of water problems usually associated with aircraft fuels and other fuels used in high performance engines.

Of course, it is to be understood that the system of this invention also functions to substantially reduce fire and explosion hazards in fuel storage and handling equipment, and thus, there is provided a very safe system for use in aircraft vehicles or for any other fuel handling or consuming device.

I claim:

1. In aircraft fuel storage and supply equipment of the type having a fuel tank, or storage area, which can be carried by an aircraft, together with inlet means for admitting fuel into the fuel tank, and means for supplying the fuel to combustion equipment of the aircraft, the improvement comprising a system for preventing condensation of moisture and growth of micro-organisms in the aircraft fuel, said system including:

a container means, in the form of an insulated pressure vessel, for carrying an inert medium which can be automatically intromitted into vapor spaces of the fuel storage and supply equipment in accordance with demands based upon consumption or transfer of fuel and changing pressure and temperature conditions, a conduit means in communication with said container means and said vapor spaces of the fuel storage and supply equipment for conveying inert medium in a gaseous state from the container means to the fuel storage and supply equipment, demand regulator means included in said conduit means for automatically controlling a flow of inert medium through the conduit means, said demand regulator means having a valve means which is biased to close the conduit and to prevent flow of inert medium therethrough until vapor pressure conditions within said fuel storage and supply equipment are slightly reduced relative to ambient pressure conditions outside of said fuel storage equipment, said valve means of said demand regulator means being responsive to a differential between said vapor pressure and ambient pressure conditions so that said conduit means is opened when a predetermined, slight differential exists in the direction of increased ambient pressure or decreased vapor pressure, and said demand regulator having means for maintaining a complete separation and isolation of the aircraft fuel storage and supply equipment from ambient atmosphere, whereby no ambient atmosphere or moisture can be received into said fuel storage and supply equipment, check valve means included in said conduit downstream of said demand regulator means for dictating a one-way flow of inert medium to said fuel storage and supply equipment and for preventing a backflow of fuel or fuel vapor into said inert medium system, and exhaust vent means included in said fuel storage and supply equipment for exhausting gases from said equipment when vapor pressure conditions within said equipment increase relative to ambient pressure conditions by a predetermined amount, said exhaust vent means including a one-way valve means for permitting a flow of gases out of the equipment at said predetermined increased pressure, while preventing a return flow of ambient atmosphere into the equipment.

2. The system of claim 1 wherein said container means is of a construction to store liquid nitrogen as said inert medium.

3. The system of claim 2 wherein a vaporizer coil is included in said conduit flow path to vaporize said liquefied nitrogen to a gas.

4. The system of claim 1 wherein said valve means of said regulator means is operated in response to movements of a diaphragm which separates said regulator into two separate chambers, a first chamber exposed to ambient atmospheric pressure conditions and a second chamber in communication with vapor pressure conditions within said fuel storage and supply equipment.

5. The system of claim 4 wherein said demand regulator means operates to open its valve means when a pressure differential of at least approximately 1/40 p.s.i.g. vacuum exists in said storage and supply equipment vapor space as compared to ambient pressure conditions when said system is operated as a nonpressurized system.

6. The system of claim 5 wherein said exhaust vent means operates to exhaust gases through its one-way valve means when a pressure differential of approximately 1/28 p.s.i.g. is reached in said storage and supply equipment vapor space as compared to ambient pressure conditions.

7. The system of claim 4 wherein said demand regulator means operates to open its valve means when the pressure within the storage and supply equipment vapor space is approximately 1/40 p.s.i.g. below a preset pressure for the system when said system is to operate as a pressurized system.

8. A method for maintaining fuel of the type found in aircraft fuel storage and supply equipment, free of moisture and micro-organism growth, comprising the steps of:

isolating said fuel storage and supply equipment from ambient atmosphere, while at the same time, exhausting gases from said equipment to the atmosphere under certain pressure, temperature, fuel transfer, and refueling conditions, automatically intromitting an inert gas into vapor spaces of said fuel storage and supply equipment when a slight reduction in pressure takes place in said vapor space, as compared to ambient air pressure conditions and a predetermined condition for said vapor space, said intromitting step taking place at a pressure differential of at least approximately 1/40 p.s.i.g. between ambient air pressure and said predetermined condition, and said exhausting step taking place when a pressure increase of approximately 1/28 p.s.i.g. develops within said vapor space, as compared to said predetermined condition for said vapor space.

9. The method of claim 8 wherein said predetermined condition for said vapor space is 0 p.s.i.g.

10. The method of claim 8 wherein said predetermined condition for said vapor space is approximately 1 p.s.i.g.

References Cited

UNITED STATES PATENTS

| | | | |
|---|---|---|---|
| 2,341,268 | 2/1944 | Davis | 220—88 |
| 2,406,373 | 8/1946 | Heigis | 220—88 |
| 2,586,839 | 2/1952 | Mapes | 220—88 |
| 2,740,604 | 4/1956 | Swigart et al. | 251—61.3 |
| 2,938,576 | 5/1960 | Cox et al. | 137—209 |
| 2,964,916 | 12/1960 | Keeping | 62—48 |

MILTON BACHLER, Primary Examiner

JAMES E. PITTENGER, Assistant Examiner

U.S. Cl. X.R.

169—2; 222—399